(12) United States Patent
Hirschi

(10) Patent No.: US 10,867,634 B1
(45) Date of Patent: Dec. 15, 2020

(54) CONTENT EDITING DURING BROADCAST

(71) Applicant: Disney Enterprises, Inc., Burbank, CA (US)

(72) Inventor: Daniel J. Hirschi, Brooklyn, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/867,212

(22) Filed: May 5, 2020

(51) Int. Cl.
G11B 27/02 (2006.01)
H04N 21/6587 (2011.01)
H04N 21/4402 (2011.01)
H04N 21/433 (2011.01)

(52) U.S. Cl.
CPC ......... *G11B 27/02* (2013.01); *H04N 21/4334* (2013.01); *H04N 21/440218* (2013.01); *H04N 21/6587* (2013.01)

(58) Field of Classification Search
CPC .............. G11B 27/02; H04N 21/4334; H04N 21/440218; H04N 21/6587
See application file for complete search history.

(56) References Cited

U.S. PATENT DOCUMENTS

| 9,351,020 | B2 | 5/2016 | Good | |
|---|---|---|---|---|
| 10,271,074 | B2 | 4/2019 | Henaire | |
| 2006/0056800 | A1* | 3/2006 | Shimagami | G11B 27/322 386/232 |
| 2012/0219271 | A1* | 8/2012 | Vunic | G06K 9/00711 386/278 |

FOREIGN PATENT DOCUMENTS

| CN | 106407437 | 2/2017 |
|---|---|---|
| CN | 106407437 A | 2/2017 |
| CN | 109168015 | 1/2019 |
| CN | 109168015 A | 1/2019 |
| CN | 109889875 | 6/2019 |
| CN | 109889875 A | 6/2019 |

OTHER PUBLICATIONS

"What is ApsaraVideo for VOD," https://www.alibabacloud.com/help/doc-detail/51236.htm?spm=a2c63.128256.a3.1.45bb17b5xVUpJV. Alibaba, Sep. 17, 2019. pp. 1-5.
"About Kurento and WebRTC," https://dockurento.readthedocs.io/en/6.10.0/user/about.html. Kurento Revision, 2018. pp. 1-6.
"About Kurento and WebRTC" by Unknown. (Kurento Revision 2018).
"What is ApsaraVideo for VOD" by Unknown. (Alibaba 2019).

* cited by examiner

*Primary Examiner* — Thai Q Tran
*Assistant Examiner* — Jose M Mesa
(74) *Attorney, Agent, or Firm* — Farjami & Farjami LLP

(57) ABSTRACT

A content editing system includes a computing platform having a hardware processor and a system memory storing a software code. The hardware processor is configured to execute the software code to record a content feed concurrently with its broadcast to produce a recorded content feed, perform a first edit of the recorded content feed during the recording and the broadcast, and begin writing a content file, during the recording and the broadcast, wherein the content file includes the a portion of the recorded content feed. The hardware processor is further configured to execute the software code to begin transcoding the content file, after beginning the writing of the content file and during the recording and the broadcast, perform a last edit of the recorded content feed, and complete the writing and the transcoding of the content file after completion of the recording.

20 Claims, 3 Drawing Sheets

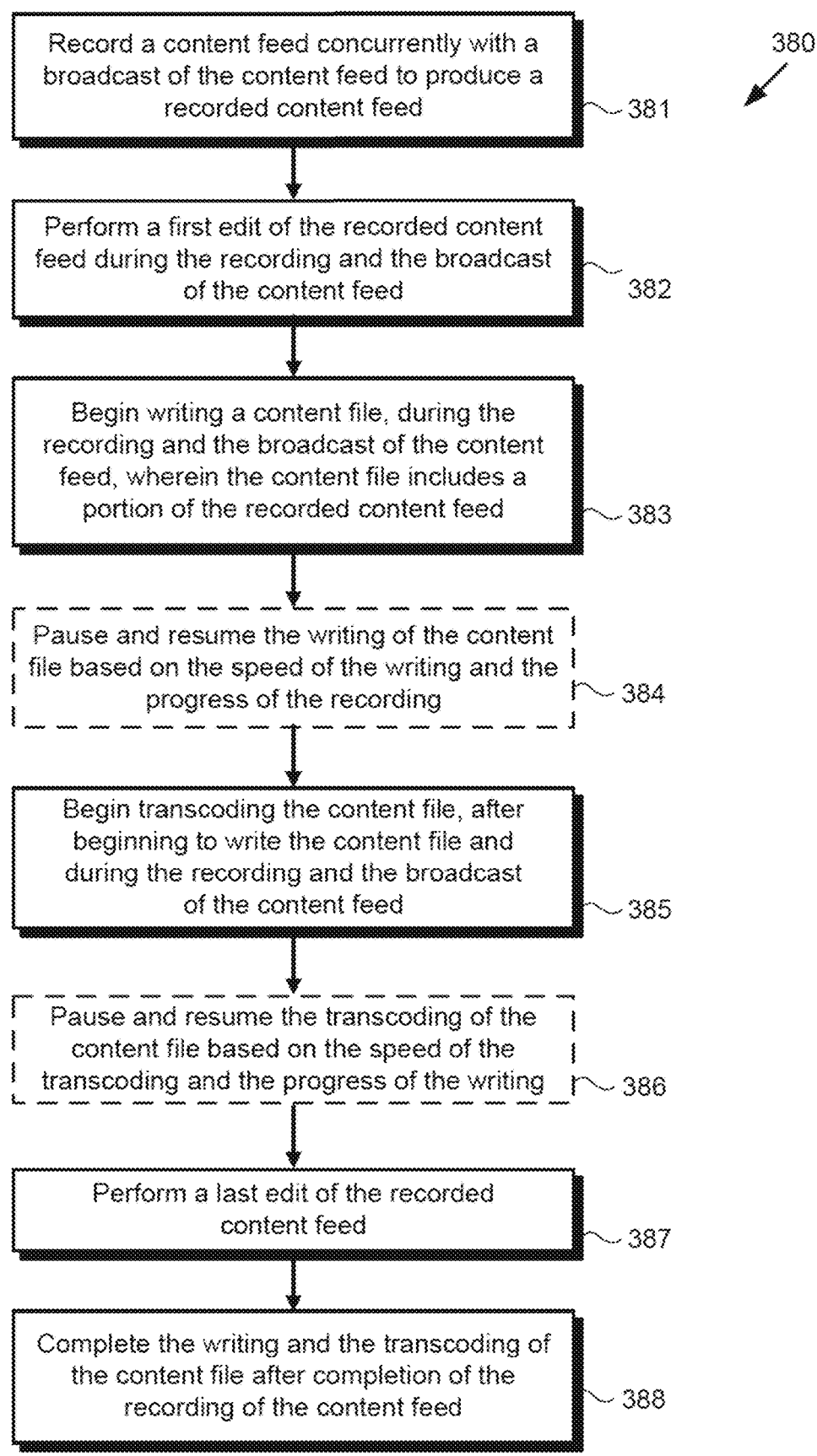

CONTENT EDITING DURING BROADCAST

BACKGROUND

Video on demand (VOD) distribution of content, such as network television (TV) programming content, for example, makes such content available for viewing by consumers after its original network broadcast. For consumers of content, the VOD model advantageously liberates them from the constraints imposed by a fixed broadcast schedule, thereby enabling consumers to enjoy content when and where they prefer, and using a viewing platform of their choice. For content owners, the additional consumption of content made possible by the VOD model can advantageously increase both ratings and revenue.

Conventional approaches to editing original broadcast content for redistribution as VOD content utilizes a recording of the original broadcast content. After the broadcast is complete, that recorded content is typically edited, written to an intermediate file, and may be transcoded in a series of non-overlapping sequential processes. As a result, VOD redistribution of content may experience significant lag time relative to the original network broadcast. However, due to the advantages accruing from early availability of VOD content to content consumers and content owners alike, there is a need in the art for content processing solutions that reduce the delay between a broadcast of content and its availability to consumers via VOD.

SUMMARY

There are provided systems and methods for performing content editing during broadcast, substantially as shown in and/or described in connection with at least one of the figures, and as set forth more completely in the claims.

BRIEF DESCRIPTION OF THE DRAWINGS

FIG. 3 shows a flowchart presenting an exemplary method for performing content editing during broadcast, according to one implementation.

DETAILED DESCRIPTION

Figure 1:
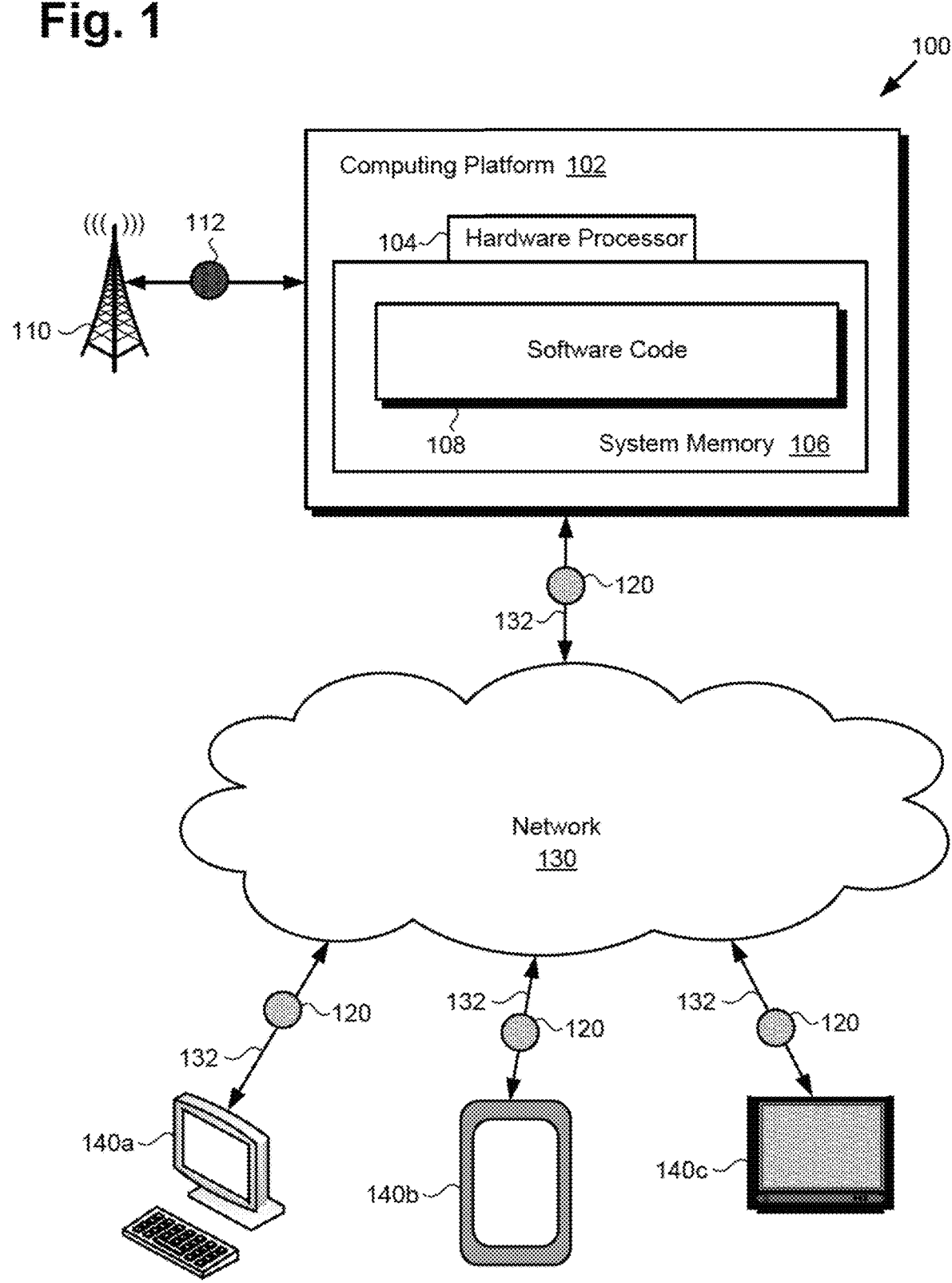
FIG. 1 shows an exemplary system for performing content editing during broadcast, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing content editing during broadcast that address and overcome the deficiencies in the conventional art. In some implementations, the systems and methods disclosed by the present application may be substantially or fully automated. It is noted that, as used in the present application, the terms "automation," "automated," and "automating" refer to systems and processes that do not require the participation of a human editor. Although, in some implementations, a human editor may predetermine edits to a recorded content feed, for example, based on a playlist for a broadcast content feed from which the recorded content feed is produced, those predetermined edits may be applied to the recorded content feed in an automated process. Thus, the methods described in the present application may be performed under the control of hardware processing components of the disclosed automated systems.

FIG. 1 shows exemplary system 100 for performing content editing during broadcast (hereinafter "content editing system 100"), according to one implementation. As shown in FIG. 1, content editing system 100 includes computing platform 102 having hardware processor 104 and system memory 106 implemented as a non-transitory storage device. According to the present exemplary implementation, system memory 106 stores software code 108.

As further shown in FIG. 1, content editing system 100 is implemented within a use environment including broadcast source 110 providing content feed 112 to content editing system 100 substantially concurrently with broadcast of content feed 112 by broadcast source 110. The use environment of content editing system 100 also includes content viewing systems 140a, 140b, and 140c (hereinafter "content viewing systems 140a-140c") receiving edited and redistributed content 120 via communication network 130. Also shown in FIG. 1 are network communication links 132 of communication network 130.

Although the present application refers to software code 108 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs such as DVDs, RAM, programmable read-only memory (PROM), erasable PROM (EPROM), and FLASH memory.

Moreover, although FIG. 1 depicts single computing platform 102, content editing system 100 may include one or more computing platforms corresponding to computing platform 102, such as computer servers for example, which may be co-located, or may form an interactively linked but distributed system, such as a cloud-based system, for instance. As a result, hardware processor 104 and system memory 106 may correspond to distributed processor and memory resources within content editing system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. Furthermore, in some implementations, content editing system 100 may be implemented virtually, such as in a data center. For example, in some implementations, content editing system 100 may be implemented in software, or as virtual machines.

It is further noted that, although content viewing systems 140a-140c are shown variously as desktop computer 140a, smartphone 140b, and smart television (smart TV) 140c, in FIG. 1, those representations are provided merely by way of example. In other implementations, one or more of content viewing systems 140a-140c may take the form of a laptop computer, tablet computer, digital media player, gaming console, a non-smart TV coupled to a set-top box, or a wearable communication device such as a smartwatch, to name a few examples.

In one implementation, broadcast source 110 may be a media entity providing content feed 112. Content feed 112 may include audio-video content from a linear TV program stream, for example, that includes a high-definition (HD) or ultra-HD (UHD) baseband video signal with embedded audio, captions, time code, and other ancillary metadata, such as ratings and/or parental guidelines. In some implementations, content feed 112 provided by broadcast source 110 may also include multiple audio tracks, and may utilize secondary audio programming (SAP) and/or Descriptive Video Service (DVS), for example. Moreover, content feed 112 may include multiple primary content segments and one or more supplemental content segments. Primary content segments included in content feed 112 may include segments of TV programming content, such as multiple frames, "shots," or scenes of such content, while a supplemental content segment or segments included in content feed 112 may include advertising content, such as a single advertisement, or multiple advertisements programmed sequentially into an "ad pod," as known in the art.

It is noted that, as used in the present application, a "shot" refers to a sequence of video frames that is captured from a unique camera perspective without cuts and/or other cinematic transitions. Thus, in various implementations, each of the primary content segments included in content feed 112 may correspond to a single frame of video, a single shot of video including multiple individual video frames, or to a scene or scenes including multiple shots.

Content feed 112 may include previously produced content, live content, or a combination of previously produced and live content. Content feed 112 may include the same source video that is broadcast to a traditional TV audience. Thus, broadcast source 110 may take the form of a conventional cable and/or satellite TV network, for example. As depicted in FIG. 1, broadcast source 110 may find it advantageous or desirable to make content included in content feed 112 available via an alternative distribution channel, such as communication network 130, which may take the form of a packet-switched network, for example, such as the Internet, as noted above. For instance, content editing system 100 may be utilized by broadcast source 110 to provide edited and redistributed content 120 corresponding to content feed 112 as part of a program stream, which may be an Internet Protocol (IP) programming stream provided via a streaming service, or a video on demand (VOD) service.

Figure 2:
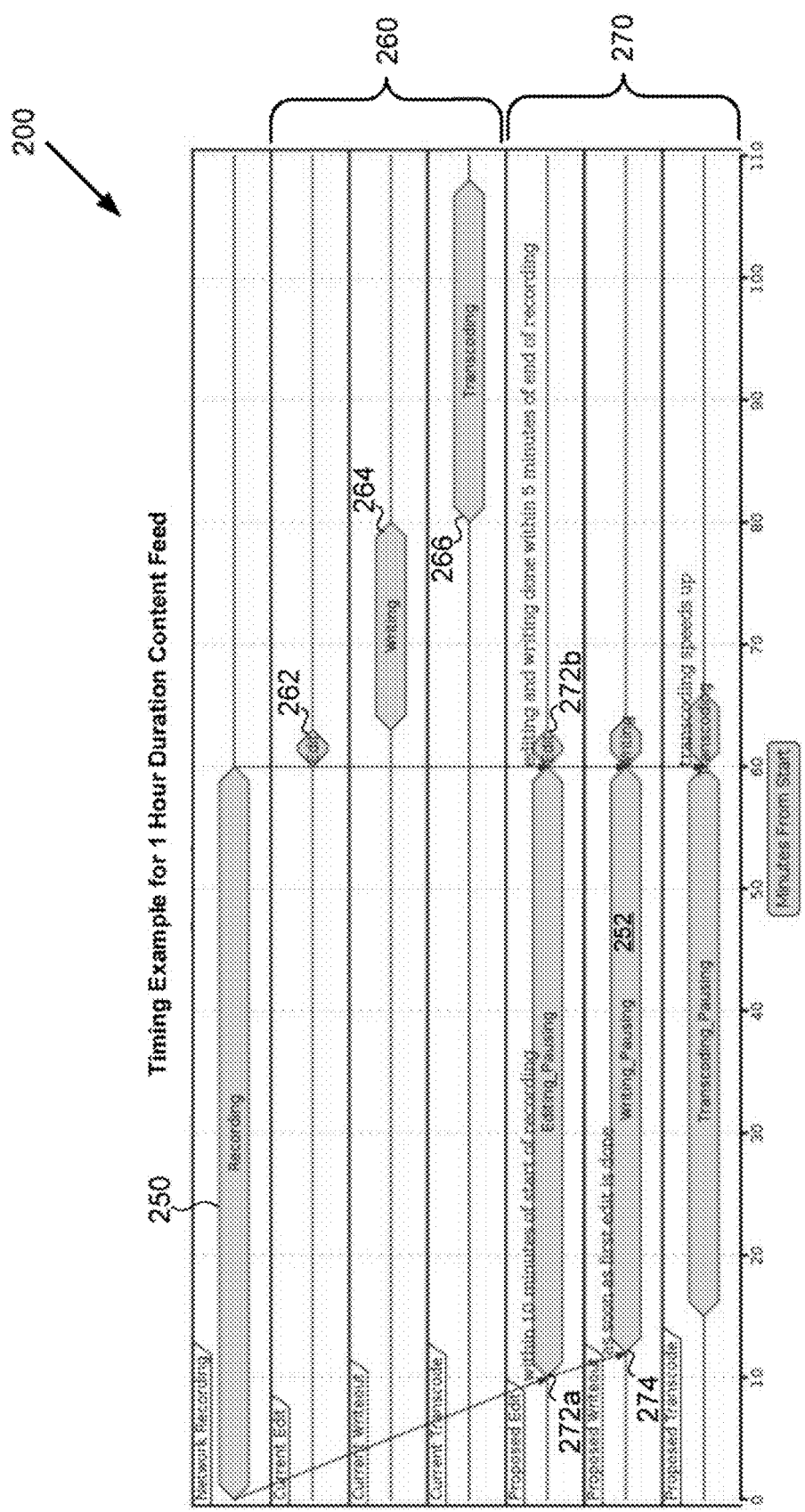
FIG. 2 shows a diagram comparing workflow timing for conventional content processing with an exemplary content editing during broadcast technique that implements the present inventive concepts.

FIG. 2 shows diagram 200 comparing workflow timing for conventional content processing 260 with exemplary new content processing 270 implementing the present inventive concepts. As shown in FIG. 2, both conventional content processing 260 and new content processing 270 utilize recorded content feed 250, which is produced by recording content feed 112, in FIG. 1, as content feed 112 is broadcast by broadcast source 110. As further shown in FIG. 2, according to conventional content processing 260, each of editing 262, content file writing 264, and content file transcoding 266 is performed sequentially after production of recorded content feed 250 has been completed. That is to say, after content feed 112 is recorded to produce recorded content feed 250 in its entirety, recorded content feed 250 undergoes editing 262; after editing 262 is complete, content file writing 264 takes place; and after content file writing 264 is complete, content file transcoding 266 is performed.

It is noted that when recorded content feed 250 includes audio-video content, transcoding is typically performed in order to reduce the size and bandwidth requirements of the video. Reduced size allows more content to be stored in a given amount of storage. Bandwidth is the amount of data that can be transmitted over a period of time. Bandwidth that is too small will cause audio-video content to stop or stutter as the data cannot be transmitted fast enough to keep up with the playout of the content. Smaller bandwidth requirements advantageously allow more instances of edited and redistributed content 120, such as VOD audio-video content, for example, to be transmitted concurrently.

As a result of the sequential processing performed in the conventional art described above, a one hour content feed may require an additional hour or more of conventional content processing 260 before content file transcoding 266 has been completed. Moreover, a content feed lasting three hours may take approximately three hours or more to process using conventional content processing 260.

By contrast, and as described in greater detail below, in new content processing 270 a substantial portion of the editing, the writing of content file 274, and the transcoding of content file 274 are performed during broadcast of content feed 112 and the concurrent recording of content feed 112 that produces recorded content feed 250. That is to say, transcoding of content file 274 including first edit 272a to recorded content feed 250 and a portion 252 of recorded content feed 250 may begin before the broadcasting and recording of content feed 112 has been completed. Consequently, and most advantageously, new content processing 270 may be completed much more quickly after last edit 272b to recorded content file 250 has been performed. In some implementations, the writing of content file 274 may be completed within less than, or substantially less than, half the time duration of content feed 112 from the end of the recording. For example, in one implementation, as indicated on diagram 200, the writing of content file 274 may be completed within less than five minutes after completion of recorded content feed 250.

The improvements over conventional content processing 260 provided by new content processing 270 disclosed in the present application may confer substantial benefits to the owner or owners of the content included in content feed 112 and edited and redistributed content 120 with respect to both ratings and revenue. By way of example, for audio-video content consumed via VOD within seven days of broadcast of that content as content feed 112 (referred to as C7), Nielsen®, the analytics company that calculates audience size and determines ratings, will count that VOD content as if it were consumed by an audience during content feed 112. Increasing the number of VOD units of content made available during that seven day window can result in a significant increase in advertiser revenue.

Nielsen® provides encoder equipment to watermark the audio portion of audio-video content. The decoder boxes used in Nielsen® selected households to measure audience size read the watermark to identify the program being watched. In order for Nielsen® to count C7 ratings, exactly the same watermark must be in edited and redistributed content 120 and in content feed 112.

However, Nielsen® tightly controls the encoder equipment, monitoring the time and the date that the encoder is used. In order for the correct watermark to be included in edited and redistributed content 120, the encoder must be used at the time of the broadcast of content feed 112. Moreover, because broadcast schedules are dynamic and subject to last minute changes, there is no practical way to finalize content feed 112 before it is actually broadcast. Consequently, recorded content feed 250 from which the VOD content is produced as edited and redistributed content 120 must be produced from the over-the-air broadcast of content feed 112. While a lead-time of a day or more would be desirable to prepare edited and redistributed content 120 for distribution as VOD content, the need to record the over-the-air broadcast of content feed 112 makes that impossible. The next best solution is to implement new content processing 270 so that edited and redistributed content 120 can be transmitted to VOD consumers as quickly as possible after the over-the-air broadcast of content feed 112 comes to an end.

The functionality of content editing system 100, in FIG. 1, will be further described by reference to FIG. 3. FIG. 3 shows flowchart 380 presenting an exemplary method for use by content editing system 100 for performing content editing during broadcast, according to one implementation. With respect to the method outlined in FIG. 3, it is noted that certain details and features have been left out of flowchart 380 in order not to obscure the discussion of the inventive features in the present application.

Referring now to FIG. 3 in combination with FIGS. 1 and 2, flowchart 380 begins with recording content feed 112 concurrently with broadcast of content feed 112 to produce recorded content feed 250 (action 381). As noted above, content feed 112 may include one or more of audio content, video content, and audio-video content. For example, content feed 112 may include video from a linear TV program stream, for example, including an HD or UHD baseband video signal. As also noted above, content feed 112 may include previously produced content, live content, or a combination of previously produced and live content.

In some implementations, as shown in FIG. 1, content feed 112 may be provided to content editing system 100 by broadcast source 110, which may be a conventional cable and/or satellite TV network, for example. In those implementations, content feed 112 may be received by, and recording of corresponding recorded content feed 250 may be initiated by, software code 108 of content editing system 100, executed by hardware processor 104.

Flowchart 380 continues with performing first edit 272a of recorded content feed 250 during the recording and the broadcast of content feed 112 (action 382). Referring specifically to FIG. 2, in some implementations, first edit 272a of recorded content feed 250 may be performed after a predetermined interval, such as a timecode or frame interval, for example, has elapsed after starting production of recorded content feed 250. According to the exemplary workflow timing of new content processing 270, for instance, first edit 272a begins within ten minutes of the start of recorded content feed 250.

First edit 272a may be performed as an automated process using a predetermined edit for content feed 112. For example, where content feed 112 includes previously produced content, first edit 272a may be performed as an automated process using the predetermined edit and the playlist for content feed 112, which would typically include the edit points for content feed 112. It is noted that, in practice, there is sometimes a timing offset between the timecode entries in the playlist for content feed 112 and the actual timecode progression of recorded content feed 250. As a result, action 382 may include detecting such an offset and compensating for the offset when editing recorded content feed 250. Action 382 may be performed by software code 108, executed by hardware processor 104 of content editing system 100.

Detection of the offset described above may be performed by comparing one or more known transitions in content feed 112 to corresponding transitions in recorded content feed 250. In some implementations, detecting and compensating for the timecode offset may be performed as an automated process. For example, where content feed 112 includes video or audio-video content, detection of the offset may be performed using an automated scene change algorithm. Where content feed 112 includes only audio, detection of the offset may be analogously performed using an automated audio sampling algorithm. Alternatively, in some implementations, it may be advantageous or desirable for a human system operator to compare one or more samples of recorded content feed 250 with the playlist for content feed 112.

First edit 272a to recorded content feed 250 may take a variety of different forms. In some implementations, first edit 272a may include adding an introduction to recorded content feed 250. Alternatively, in some implementations, first edit 272a may replace one or more segments of recorded content feed 250 with replacement content. In some implementations, content feed 112 and recorded content feed 250 may include multiple segments of primary content, such as shots or scenes of video or audio-video content, for example, as well as multiple segments of supplemental content, such as advertising content. In some of those implementations, first edit 272a may include deleting one or more segments of primary content, or replacing one or more segments of primary content with alternative segment(s) of primary content. In other implementations, first edit 272a may include replacing one or more segments of supplemental content in the form of advertising with other advertising content.

Flowchart 380 continues with beginning to write content file 274, during the recording and the broadcast of content feed 112, where content file 274 includes portion 252 included in recorded content feed 250 when the writing is initiated (action 383). The writing of content file 274 may begin after recording of content feed 112 to produce recorded content feed 250. In some implementations, as shown in FIG. 2, the writing of content file 274 may begin after first edit 272a is performed, in which case portion 252 of recorded content feed 250 would include first edit 272a. However, in other implementations, writing of content file 274 may begin prior to first edit 272a. That is to say, in some implementations, action 383 may precede action 382 described above. Action 383 may be performed by software code 108, executed by hardware processor 104 of content editing system 100.

In implementations in which the writing of content file 274 begun in action 383 proceeds at the same rate, or more slowly than, the broadcast of content feed 112 and the concurrent production of recorded content feed 250, the writing of content file 274 may proceed uninterruptedly until content file 274 is complete. However, in implementations in which the writing of content file 274 proceeds faster than the production of recorded content feed 250, flowchart 380 continues with pausing and resuming the writing of content file 274 based on the speed of the writing and the progress of the recording of content feed 112 (action 384).

For example, after the writing of content file 274 is begun in action 383, the writing of content file 274 may continue until content file 274 catches up with recorded content feed 250, at which point the writing of content file 274 may be paused until the content included in recorded content feed 250 exceeds the content written into content file 274 by some predetermined threshold. When that threshold is reached, the writing of content file 274 may be resumed until content file 274 once again catches up with recorded content feed 250. The pausing and resuming of action 384 may be repeated until the recording of content feed 112 to produce recorded content feed 250 is completed. When included in the method outlined by flowchart 380, action 384 may be performed by software code 108, executed by hardware processor 104 of content editing system 100. However, it is noted that in implementations in which the writing of content file 274 begun in action 383 proceeds at the same rate, or more slowly than, the production of recorded content feed 250, action 384 may be omitted from the method outlined by flowchart 380.

Flowchart 380 continues with beginning to transcode content file 274, after beginning the writing of content file 274 and during the recording and the broadcast of content feed 112 (action 385). The transcoding of content file 274 may begin after any desired delay subsequent to the beginning of the writing of content file 274. As noted above, in practice, there is sometimes a timing offset between the timecode entries in the playlist for content feed 112 and the actual timecode progression of recorded content feed 250. As a result, action 385 may include compensating for that offset when transcoding content file 274. Action 385 may be performed by software code 108, executed by hardware processor 104 of content editing system 1).

In implementations in which the transcoding of content file 274 begun in action 385 proceeds at the same rate, or more slowly than, the writing of content file 274, the transcoding of content file 274 may proceed uninterruptedly until the transcoding of content file 274 is complete. However, in implementations in which the transcoding of content file 274 proceeds faster than the writing of content file 274, flowchart 380 continues with pausing and resuming the transcoding of content file 274 based on the speed of the transcoding and the progress of the writing of content file 274 (action 386).

For example, after the transcoding of content file 274 is begun in action 385, the transcoding of content file 274 may continue until the transcoding catches up with the writing of content file 274, at which point the transcoding of content file 274 may be paused until the content included in content file 274 exceeds the transcoded content by some predetermined threshold. When that threshold is reached, the transcoding of content file 274 may be resumed until the transcoding once again catches up with the writing of content file 274. The pausing and resuming of action 386 may be repeated until the writing of content file 274 is completed. When included in the method outlined by flowchart 380, action 386 may be performed by software code 108, executed by hardware processor 104 of content editing system 100. However, it is noted that in implementations in which the transcoding of content file 274 begun in action 385 proceeds at the same rate, or more slowly than, the writing of content file 274, action 386 may be omitted from the method outlined by flowchart 380.

Flowchart 380 continues with performing last edit 272b of recorded content feed 250 (action 387). Referring specifically to FIG. 2, in some implementations, last edit 272b of recorded content feed 250 may be performed after production of recorded content feed 250 is complete. However, in other implementations, last edit 272b may be performed during the recording and the broadcast of content feed 112. That is to say, in some implementations, last edit 272b of recorded content feed 250 may be performed before the broadcast of content feed 112 comes to an end.

Like first edit 272a performed in action 382, last edit 272b may be performed as an automated process using a predetermined edit for content feed 112 and the playlist for content feed 112. As noted above, in practice, there is sometimes a timing offset between the timecode entries in the playlist for content feed 112 and the actual timecode progression of recorded content feed 250. As a result, action 387 may include compensating for the offset when editing recorded content feed 250. Action 387 may be performed by software code 108, executed by hardware processor 104 of content editing system 100.

In some implementations, last edit 272b may include adding an outro, as known in the art, or a coda, to recorded content feed 250. Alternatively, in some implementations, last edit 272b may replace one or more segments of recorded content feed 250 with replacement content. In some implementations, as noted above, content feed 112 and recorded content feed 250 may include multiple segments of primary content, such as shots or scenes of video or audio-video content, for example, as well as multiple segment of supplemental content, such as advertising content. In some of those implementations, last edit 272b may include deleting one or more segments of primary content, or replacing one or more segments of primary content with alternative segment(s) of primary content. In other implementations, last edit 272b may include replacing one or more segments of supplemental content in the form of advertising with other advertising content.

Flowchart 380 can conclude with completing the writing and the transcoding of content file 274 after completion of the recording of content feed 112 (action 388). Completion of the writing and the transcoding of content file 274 in action 388 may be performed by software code 108, executed by hardware processor 104 of content editing system 100.

It is noted that, due to the editing, writing, and transcoding already performed in actions 382, 383, 385, and 387, or in actions 382, 383, 384, and 385 (hereinafter "actions 382-385") and 387, or in actions 382, 383, 385, 386, and 387, or in actions 382-385, 386, and 387, the editing of recorded content feed 250 may be completed, and the writing and transcoding of content file 274 may have been substantially performed prior to completion of recorded content feed 250. As a result, action 388 may be completed quickly subsequent to the broadcast and concurrent recording of content feed 112. In some implementations, the writing of content file 274 may be completed within less than, or substantially less than, half the time duration of content feed 112 from the end of the recording. For example, in one implementation, as indicated on diagram 200, the writing of content file 274 may be completed within less than five minutes after completion of the recording of content feed 112. The subsequent completion of the transcoding of content file 274 may depend on the speed of the transcoder being used. Nevertheless, due to the substantial amount of transcoding performed prior to action 388, completion of the transcoding can advantageously occur much faster than would be the case in conventional content processing 260.

It is further noted that, in some implementations, hardware processor 104 of system 100 may execute software code 108 to perform actions 381, 382, 383, 385, and 387, or in actions 381, 382, 383, 384, and 385 (hereinafter "actions 381-385") and 387, or in actions 381, 382, 383, 385, 386, and 387, or in actions 381-385, 386, and 387, in an automated process from which human involvement may be omitted.

Thus, the present application discloses systems and methods for performing content editing during broadcast that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations am to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content editing system comprising:
a computing platform having a hardware processor and a system memory storing a software code;
the hardware processor configured to execute the software code to:
record a content feed concurrently with a broadcast of the content feed to produce a recorded content feed;
perform a first edit of the recorded content feed during the recording and the broadcast of the content feed;
begin a writing of a content file, during the recording and the broadcast of the content feed, wherein the content file includes a portion of the recorded content feed;
begin a transcoding of the content file, after beginning the writing of the content file and during the recording and the broadcast of the content feed;
perform a last edit of the recorded content feed; and
complete the writing and the transcoding of the content file after completion of the recording of the content feed.

2. The content editing system of claim 1, wherein the hardware processor is further configured to execute the software code to:
pause and resume the writing of the content file based on a speed of the writing and a progress of the recording of the content feed.

3. The content editing system of claim 2, wherein the hardware processor is further configured to execute the software code to:
pause and resume the transcoding of the content file based on a speed of the transcoding and a progress of the writing of the content file.

4. The content editing system of claim 1, wherein the hardware processor is further configured to execute the software code to:
pause and resume the transcoding of the content file based on a speed of the transcoding and a progress of the writing of the content file.

5. The content editing system of claim 1, wherein the first edit comprises adding an introduction to the recorded content feed.

6. The content editing system of claim 1, wherein the last edit comprises adding an outro to the recorded content feed.

7. The content editing system of claim 1, wherein the recorded content feed includes a plurality of segments of content including primary content segments and supplemental content segments, and wherein at least one of the first edit or the last edit replaces at least one of the plurality of segments of content with a replacement content.

8. The content editing system of claim 7, wherein the replacement content comprises advertising content for replacing at least one of the supplemental content segments.

9. The content editing system of claim 7, wherein the replacement content comprises alternative primary content for replacing at least one of the primary content segments.

10. The content editing system of claim 1, wherein the content feed comprises at least one of audio content, video content, or audio-video content.

11. A method for use by a content editing system including a computing platform having a hardware processor and a memory storing a software code, the method comprising:
recording, by the software code executed by the hardware processor, a content feed concurrently with a broadcast of the content feed to produce a recorded content feed;
performing, by the software code executed by the hardware processor, a first edit of the recorded content feed during the recording and the broadcast of the content feed;
beginning a writing of a content file, by the software code executed by the hardware processor, during the recording and the broadcast of the content feed, wherein the content file includes a portion of the recorded content feed;
beginning a transcoding of the content file, by the software code executed by the hardware processor, after beginning the writing of the content file and during the recording and the broadcast of the content feed;
performing, by the software code executed by the hardware processor, a last edit of the recorded content feed; and
completing the writing and the transcoding of the content file, by the software code executed by the hardware processor, after completion of the recording of the content feed.

12. The method of claim 11, further comprising:
pausing and resuming, by the software code executed by the hardware processor, the writing of the content file based on a speed of the writing and a progress of the recording of the content feed.

13. The method of claim 12, further comprising:
pausing and resuming, by the software code executed by the hardware processor, the transcoding of the content file based on a speed of the transcoding and a progress of the writing of the content file.

14. The method of claim 11, further comprising:
pausing and resuming, by the software code executed by the hardware processor, the transcoding of the content file based on a speed of the transcoding and a progress of the writing of the content file.

15. The method of claim 11, wherein the first edit comprises adding an introduction to the recorded content feed.

16. The method of claim 11, wherein the last edit comprises adding an outro to the recorded content feed.

17. The method of claim 11, wherein the recorded content feed includes a plurality of segments of content including primary content segments and supplemental content segments, and wherein at least one of the first edit or the last edit replaces at least one of the plurality of segments of content with a replacement content.

18. The method of claim 17, wherein the replacement content comprises advertising content for replacing at least one of the supplemental content segments.

19. The method of claim 17, wherein the replacement content comprises alternative primary content for replacing at least one of the primary content segments.

20. The method of claim 11, wherein the content feed comprises at least one of audio content, video content, or audio-video content.

\* \* \* \* \*